United States Patent
DiZio et al.

(10) Patent No.: US 10,520,744 B2
(45) Date of Patent: Dec. 31, 2019

(54) ADHESIVES INHIBITING FORMATION OF ARTIFACTS IN POLYMER BASED OPTICAL ELEMENTS

(71) Applicant: 3M INNOVATIVE PROPERTIES COMPANY, St. Paul, MN (US)

(72) Inventors: James P. DiZio, Saint Paul, MN (US); Maureen C. Nelson, West Saint Paul, MN (US); Kathleen E. Hoelscher, Crescent Springs, KY (US); Beverly J. Blake, Loveland, OH (US); Erin L. Coleman, Lebanon, OH (US); Charles L. Bruzzone, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 147 days.

(21) Appl. No.: 15/589,657

(22) Filed: May 8, 2017

(65) Prior Publication Data
US 2017/0242265 A1    Aug. 24, 2017

Related U.S. Application Data

(63) Continuation of application No. 12/443,342, filed as application No. PCT/US2007/079389 on Sep. 25, 2007, now abandoned.
(Continued)

(51) Int. Cl.
*G02B 27/28* (2006.01)
*G02B 5/30* (2006.01)
(Continued)

(52) U.S. Cl.
CPC .......... *G02B 27/283* (2013.01); *B29C 65/483* (2013.01); *B29D 11/00644* (2013.01);
(Continued)

(58) Field of Classification Search
None
See application file for complete search history.

(56) References Cited

U.S. PATENT DOCUMENTS

| 3,711,176 A | 1/1973 | Alfrey, Jr. et al. |
| 3,998,524 A | 12/1976 | Hubby, Jr. et al. |

(Continued)

FOREIGN PATENT DOCUMENTS

| EP | 0 523 875 | 1/1993 |
| EP | 1 300 438 | 4/2003 |

(Continued)

OTHER PUBLICATIONS http://www.thefreedictionary.com/adhesive>, Retrieved from the World Wide Web on Jan. 13, 2012.
(Continued)

*Primary Examiner* — Derek S. Chapel
(74) *Attorney, Agent, or Firm* — Jeffrey M. Olofson

(57) ABSTRACT

Inhibiting formation of optical artifacts in a multi-layer film polarizer of an optical imaging assembly that includes a polarizing beam splitter. The beam splitter may include a multilayer reflective polarizing film having at least two materials, one of which may exhibit birefringence after uniaxial orientation; an adhesive disposed on the multilayer reflective polarizing film; and at least a first prism disposed on the adhesive. The adhesive may include a plasticizer for inhibiting formation of optical artifacts in the polarizing film.

5 Claims, 3 Drawing Sheets

Related U.S. Application Data

(60) Provisional application No. 60/827,659, filed on Sep. 29, 2006.

(51) Int. Cl.
| | |
|---|---|
| *G02B 1/04* | (2006.01) |
| *B29C 65/48* | (2006.01) |
| *B29D 11/00* | (2006.01) |
| *C09J 11/06* | (2006.01) |
| *C09J 163/00* | (2006.01) |
| *G02B 5/04* | (2006.01) |
| *B29L 11/00* | (2006.01) |
| *C08K 5/053* | (2006.01) |
| *C08K 5/11* | (2006.01) |

(52) U.S. Cl.
CPC .............. *C09J 11/06* (2013.01); *C09J 163/00* (2013.01); *G02B 1/04* (2013.01); *G02B 5/04* (2013.01); *G02B 5/305* (2013.01); *B29K 2995/0026* (2013.01); *B29L 2011/0066* (2013.01); *C08K 5/053* (2013.01); *C08K 5/11* (2013.01)

(56) References Cited

U.S. PATENT DOCUMENTS

| | | | |
|---|---|---|---|
| 4,378,392 A | 3/1983 | Segel | |
| 4,519,161 A | 5/1985 | Gilead et al. | |
| 4,679,918 A | 7/1987 | Ace et al. | |
| 5,103,337 A | 4/1992 | Schrenk et al. | |
| 5,456,859 A | 9/1995 | Sannohe et al. | |
| 5,638,480 A | 6/1997 | Ishiharada et al. | |
| 5,867,241 A | 2/1999 | Sampica et al. | |
| 5,882,774 A | 3/1999 | Jonza et al. | |
| 5,962,114 A | 10/1999 | Jonza et al. | |
| 6,068,794 A | 5/2000 | Kobayashi et al. | |
| 6,111,700 A | 8/2000 | Kobayashi et al. | |
| 6,218,679 B1 | 4/2001 | Takahara et al. | |
| 6,246,506 B1 | 6/2001 | Kobayashi et al. | |
| 6,268,458 B1 | 7/2001 | Soane et al. | |
| 6,368,699 B1 | 4/2002 | Gilbert et al. | |
| 6,426,128 B1 | 6/2002 | Kimmel et al. | |
| 6,472,809 B2 | 10/2002 | Motomiya et al. | |
| 6,486,997 B1 | 11/2002 | Bruzzone et al. | |
| 6,609,795 B2 | 8/2003 | Weber et al. | |
| 6,642,991 B2 | 11/2003 | Krum et al. | |
| 6,661,482 B2 | 12/2003 | Hara | |
| 6,760,157 B1 | 7/2004 | Allen et al. | |
| 6,797,797 B2 | 9/2004 | Takeo et al. | |
| 6,811,261 B2 | 11/2004 | Kurumisawa | |
| 6,811,841 B1 | 11/2004 | Castiglione et al. | |
| 6,829,090 B2 | 12/2004 | Katsumata et al. | |
| 6,910,773 B2 | 6/2005 | Nakashima et al. | |
| 6,916,440 B2 | 7/2005 | Jackson et al. | |
| 6,936,209 B2 | 8/2005 | Jackson et al. | |
| 6,939,499 B2 | 9/2005 | Merrill et al. | |
| 6,946,188 B2 | 9/2005 | Hebrink et al. | |
| 6,949,212 B2 | 9/2005 | Merrill et al. | |
| 6,989,418 B2 | 1/2006 | Ko et al. | |
| 7,012,747 B2 | 3/2006 | Kagawa et al. | |
| 7,038,746 B2 | 5/2006 | Tominaga et al. | |
| 7,160,972 B2 | 1/2007 | Young et al. | |
| 7,267,471 B2 | 9/2007 | Torihara | |
| 7,315,418 B2 | 1/2008 | DiZio et al. | |
| 2004/0209020 A1 | 10/2004 | Castiglione et al. | |
| 2004/0227994 A1 | 11/2004 | Ma et al. | |
| 2005/0168697 A1 | 8/2005 | Bruzzone et al. | |
| 2006/0221447 A1 | 10/2006 | DiZio et al. | |
| 2007/0082969 A1* | 4/2007 | Malik | C09J 163/00 522/178 |
| 2009/0294057 A1* | 12/2009 | Liang | C09J 151/04 156/330 |

FOREIGN PATENT DOCUMENTS

| | | |
|---|---|---|
| EP | 1 300 700 | 4/2003 |
| JP | 03-120503 | 5/1991 |
| JP | 07-005413 | 1/1995 |
| JP | 8-207208 | 2/1995 |
| JP | 07-084125 | 3/1995 |
| JP | 11-314335 | 1/1999 |
| JP | 2001-109925 | 1/2001 |
| JP | 2002-189127 | 7/2002 |
| JP | 2003-237006 | 8/2003 |
| JP | 2003-253265 | 9/2003 |
| JP | 2004-053685 | 2/2004 |
| JP | 2004/053914 | 2/2004 |
| JP | 2004-219800 | 8/2004 |
| JP | 2004-227730 | 8/2004 |
| JP | 2004-323589 | 11/2004 |
| JP | H09-137143 A | 11/2004 |
| WO | WO 1995/17303 | 6/1995 |
| WO | WO 1996/19347 | 6/1996 |
| WO | WO 2001/79920 | 10/2001 |
| WO | WO 2004/94142 | 11/2004 |
| WO | WO 2005/081039 A1 | 9/2005 |

OTHER PUBLICATIONS

U.S. Appl. No. 60/827,659, filed Sep. 29, 2006, Titled "Adhesives Inhibiting Formation of Artifacts in Polymer Based Optical Elements".

\* cited by examiner

ADHESIVES INHIBITING FORMATION OF ARTIFACTS IN POLYMER BASED OPTICAL ELEMENTS

CROSS REFERENCE TO RELATED APPLICATIONS

This application is a continuation of U.S. application Ser. No. 12/443,342, filed on Mar. 27, 2009, which is a national stage filing under 35 U.S.C. 371 of PCT/US2007/079389, filed on Sep. 25, 2007, which claims priority to U.S. Provisional Application No. 60/827,659, filed on Sep. 29, 2006, the disclosure of which is incorporated by reference in its/their entirety herein.

BACKGROUND

Polarizing beam splitter (PBS) assemblies are found in a variety of optical imaging assemblies, such as front and rear projection systems, projection displays, head-mounted displays, virtual viewers, head up displays, optical computing, optical correlation, and other similar optical viewing and display systems. A PBS assembly may include at least one multilayer reflective optical polarizing film (MOF). In general, a MOF is a multi-layer polymer based film that functions as a polarizer and contains at least two different materials, at least one of which exhibits birefringence after uniaxial orientation. The MOF film is sandwiched between two prisms and functions to reflect a particular polarization of light while transmitting orthogonal polarizations. An adhesive is disposed between the MOF and a surface of at least one of the prisms to provide for structural integrity of the PBS assembly as well as provide optical coupling.

One example of a PBS assembly use is in a liquid crystal on silicon (i.e., LCOS) rear projection television system. LCOS rear projection television systems generate relatively high amounts of light energy and heat. Impingement onto the PBS assembly of such light energy levels and heat, especially over time, can have significant adverse effects on the average lifetimes of PBS assemblies. More particularly, relatively high amounts of light energy and heat can reduce transmissivity of the MOF over time.

SUMMARY

There is a need for continuing improvements, whereby the stability and/or useful life of optical imaging assemblies, particularly those utilizing polarizing elements, can be extended in a manner that does not otherwise compromise their optical benefits.

The present description includes a polarizing beam splitter, comprising a polymer based polarizing film. An adhesive layer is disposed on the polarizing film and a first optical element is disposed on the adhesive layer. The adhesive layer includes at least a crystallization inhibiting plasticizer component in an amount effective for inhibiting formation of (i) crystallized domains; (ii) particles; or (iii) a combination thereof that cause optical artifacts in the polarizing film.

In another aspect, the present description provides an optical apparatus comprising a polymer based optical element and an adhesive disposed on the optical element. The adhesive comprises a crystallization inhibiting plasticizer component in an amount effective for inhibiting formation of (i) crystallized domains; (ii) particles; or (iii) a combination thereof in the optical element that cause optical artifacts in the optical element.

Yet another aspect of the present description provides a polarizing beam splitter comprising a birefringent film having a plurality of first material layers and a plurality of second material layers. The first material layers include a polymer selected from the group consisting of polyethylene terephthalate and copolymers of polyethylene terephthalate and polyethylene naphthalate. The second material layers include a copolyester. The polarizing beam splitter further includes at least one prism comprising a base adjacent a first major surface of the birefringent film and an adhesive disposed between the first major surface and the birefringent film. The adhesive comprises at least a crystallization inhibiting plasticizer in an amount effective for inhibiting crystallization and/or particle formation in the polarizing film.

Another aspect of the description provides a method of stabilizing a polymer based optical element comprising disposing an adhesive on a polymer based optical element. The adhesive comprises a crystallization inhibiting plasticizer component in an amount effective for inhibiting formation of (i) crystallized domains; (ii) particles; or (iii) combinations thereof, that cause optical artifacts in an adjacent polymer based optical element. The method further includes passing radiation through the adhesive and the optical element wherein crystallized domains and/or particles are inhibited from forming in the optical element.

BRIEF DESCRIPTION OF THE DRAWING

This description may be more completely understood in consideration of the following detailed description of various embodiments in connection with the accompanying drawings, in which.

DETAILED DESCRIPTION

One aspect of this description relates to adhesives utilized in combination with a polymer based polarizing film for avoiding optical artifacts induced in such film when used, for example, in an optical imaging system that includes a Cartesian polarizing beam splitter ("PBS") of a kind used in projection systems. Particularly useful embodiments of the invention address the use of PBS's that are subject to continued exposures under relatively high light energy and heat conditions which tend to reduce stability and/or useful life of standard PBS assemblies. For example, after extended periods of use some MOF films can yellow and char in a relatively short time period following initiation of the formation of haze in the MOF films. This rapid and pronounced failure is a special concern when utilized in extremely expensive projection systems, such as rear projection television systems.

It has been determined that the haze formed in polarizing films of PBS assemblies may be influenced by humidity and that average lifetimes are generally lower in dryer environments than in wetter environments. Accordingly, the average lifetimes of such PBS assemblies while operated under such relatively high light irradiance and associated heat especially in dry conditions are diminished significantly.

While the following illustrated embodiments are described in the context of such a projection system, the principles and scope of the present invention are not limited thereby. Rather, the present invention is more broadly directed to adhesives particularly adapted for use in combination with polymer based optical elements, whereby optical artifacts, such as haze, can be minimized or eliminated. Hence, optical imaging systems described herein are exemplary of many different kinds in which the present invention is useful.

Figure 1:
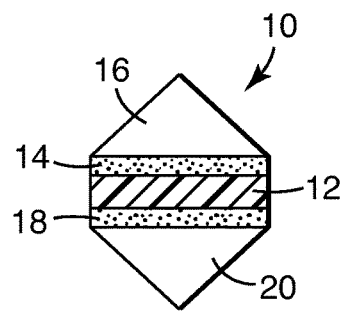
FIG. 1 schematically illustrates an embodiment of a PBS having a multilayer reflective polarizing film.

FIG. 1 illustrates one embodiment of a polarizing beam splitter (PBS) assembly 10. A PBS assembly is an optical component that splits incident light rays into a first (transmitted) polarization component and a second (reflected) polarization component. PBS assembly 10 includes a thin film, polymer based, multilayer reflective polarizing film 12, at least one adhesive layer 14 adhered between mutually opposing surfaces of multilayer reflective polarizing film 12 and an optical substrate, such as prism 16; at least one adhesive layer 18 adhered between mutually opposing surfaces of multilayer reflective polarizing film 12 and an optical substrate, such as prism 20. PBS assembly 10 is similar to one described in commonly assigned U.S. Pat. No. 6,486,997 and to copending and commonly assigned US Patent Publication No. 2005/0168697A1.

While PBS assembly 10 illustrates multilayer reflective polarizing film 12 sandwiched between prisms 16 and 20, it will be appreciated that multilayer reflective polarizing film 12 may be adhered to just one surface of one of the optical prisms. Multilayer reflective polarizing film 12 may function as a polarizer and may contain at least two different materials, at least one of which may exhibit birefringence after uniaxial orientation.

Although depicted as including two prisms 16 and 20, PBS assembly 10 may include any suitable optical elements, such as optical substrates or the like disposed on one or either side of multilayer reflective polarizing film 12. Prisms 16 and 20 can be constructed from any light transmissive material having a suitable refractive index to achieve the desired purpose of the PBS assembly. The prisms should have refractive indices less than that which would create a total internal reflection condition for beams of light with the intended f-number. Prisms 16 and 20 are typically made of isotropic materials, although other materials can be used. Typical materials for use as prisms include, but are not limited to, ceramics, glass, and polymers. For environmental purposes, a more particular category of glass includes glasses that do not contain lead oxide, but can contain other metallic oxides, such as boron oxide. A more typical example is a commercially available glass N-SK-5, available from Schott, Corp. of Dureya, Pa., USA having no lead content and an index of refraction of about 1.584.

More particularly, PBS assembly 10 can have prism 16 and prism 20. Prism 16 is the prism that first accepts the incoming light from a light source. The adhesive carries additives that inhibit the formation of optical artifacts that diminish transmissivity in polymer based optical elements while the PBS assembly is subjected to high intensity light for significant exposure times. Adhesives with such additives are preferably placed at least between prism 16, which is closest to the source of light, and multilayer reflective polarizing film 12.

Polarizing Element

Figure 2:
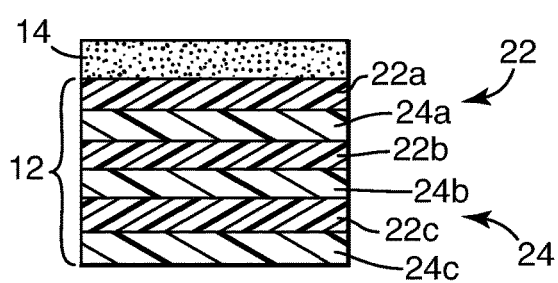
FIG. 2 schematically illustrates an enlarged cross-section of a multilayer reflective polarizing film and adhesive.
Figure 3:
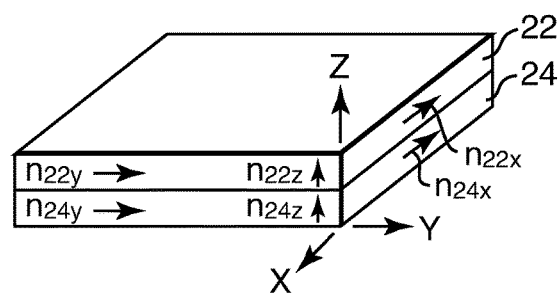
FIG. 3 schematically illustrates an enlarged perspective of a portion the multilayer reflective polarizing film.

As illustrated in FIGS. 2 and 3, multilayer reflective polarizing film 12 is a polarizer such as described in commonly assigned U.S. Pat. No. 6,609,795. It operates to discriminate between nominally s- and p-polarized light. In particular, multilayer reflective polarizing film 12 may be birefringent and may have at least two materials of different refractive index, one of which exhibits birefringence after uniaxial orientation. In one embodiment, multilayer reflective polarizing film 12 is comprised of a plurality of stacked alternating first and second light-transmissive layers $22_{a-n}$ (collectively 22) and $24_{a-n}$ (collectively 24) disposed between the adhesive layers 14, 18. While multilayer reflective polarizing film 12 may generally comprise hundreds of layers, this simplified illustration exemplifies the principles of operation of the polarizer. Each of first and second layers 22, 24 is provided with refractive indices in the x, y, and z directions. For example, first layer 22 may have a first set of refractive indices n.sub.22x, n.sub.22y, n.sub.22z and second layer 24 may each have a second set of refractive indices, n.sub.24x, n.sub.24y, and n.sub.24z.

Another aspect of multilayer reflective polarizing film 12 is that the materials of first and second layers 22, 24 begin as isotropic materials (i.e., having substantially similar refractive indices in the x, y, and z directions) and after uniaxial orientation, at least one of the materials exhibits birefringence. There are three possible combinations: (1) the first material exhibits birefringence while the second material remains isotropic, (2) the first material remains isotropic while the second material exhibits birefringence, and (3) the first and second both exhibit birefringence. In a preferred embodiment, after uniaxial orientation, the first material is birefringent and experiences an increase in refractive index along the stretched direction while the second material remains isotropic and the refractive index difference between the first and second material is typically between specified value 0.15 and 0.25 in the stretch direction.

It will be appreciated that the composition of multilayer reflective polarizing film 12 can vary considerably given the optical properties desired for a particular optical system that is to be constructed, such as the PBS assembly 10. As noted, the broad scope of this invention is not limited to the particular composition of a polymeric multilayer reflective polarizing film 12 or its method of fabrication. Therefore, the description of multilayer reflective polarizing film 12 in this embodiment is for use in an optical system. PBS assembly 10 is but one example of many that can be used.

In a preferred embodiment, the polarizing film has first and second layers 22, 24 made of first and second polymers; respectively. For example, first layer 22 may be a relatively high index layer while second layer 24 may be a low index layer. These relative values refer to the indices observed along the x direction of multilayer reflective polarizing film 12. Many relatively high and low index polymeric materials may be used. In this embodiment, the relatively high index polymer in first layer 22 may be a polyethylene naphthalate (PEN) film. The low index second layer 24 may be a polyethylene terephthalate (PET) film. Other suitable polymeric materials can serve as the birefringent/isotropic layers. The indices of first and second layers 22, 24 can be suitably composed and/or fabricated to exhibit the desired optical properties necessary to achieve the kinds and degrees of optical properties, such as polarizations, sought. For example, to modify the optical properties at least one of first or second layers 22, 24, the layer is stretched uniaxially in specified directions by known means, whereby for example, first layer 22 can have its collective refractive index modified. Typically many low index polymeric materials may be stretched. One typical low index polymer film may a polyethylene terephthalate (PET) film. Reference is made to commonly assigned U.S. Pat. No. 6,609,795 for a description of examples of the materials that may be used for making multilayer reflective polarizing film 12. Suitable polymers for use as the low index layer when PET is used as the relatively high index layer are as follows. It may be desirable for the low index polymers to remain isotropic upon uniaxial orientation at typical PET draw temperatures. Thus, the low index polymers may have a glass transition temperature below that of PET (i.e., less than about 80 degrees C.°). The low refractive index polymers may have one or more the following properties: (1) thermal stability at PET melt processing temperatures, (2) UV stable or UVA protectable, (3) relatively high clarity (i.e., relatively high transmission and low absorption), (4) rheological properties close enough to PET for stable flow during coextrusion, (5) good interlayer adhesion with PET, (6) low dispersion, and (7) drawability (i.e., the ability to be oriented) without birefringence. The present invention contemplates that other kinds of polymer based optical elements or polarizers, such as retarder films, absorptive polarizes, PEN- or polycarbonate (PC)-containing polarizers, wavelength plates, color filters, mirrors, color mirrors, and other suitable types. Clearly, other polymeric materials are possible and other polymer materials can be used as first and second material layers so long as the criteria discussed herein have been satisfied.

Adhesives

Reference is made also to FIG. 2 for illustrating one embodiment of adhesive layer 14 made consistent with the teachings of this description. Adhesive layer 14 may be any suitable optical or transparent adhesive composition used for bonding optical elements, such as PBS assemblies. As used in this regard, "transparent" means that the transparent adhesive composition layer must allow an effective proportion of incident radiation to pass therethrough. The present description envisions that it is applicable to more than visible light and is intended to embrace inhibiting crystallization or particle formation that creates artifacts for the transmission of wavelengths outside the visible spectrum. The artifacts that are minimized or eliminated are primarily haze that causes light scattering due to crystalline domains and/or particles greater than about 100 nm in size. Scattering will generally occur when the size of the crystalline domains and/or particles are about ¼ wavelength (e.g. 100 nanometers), and as such cause a whitish haze in the polarizing film. As used in the present application, the term "crystallized domains" means nodules that form in the polymer that are large enough to form haze and includes nodules/particles that are a compilation of crystallized polymer chains and/or fragments thereof.

The adhesive composition of this description contains one or more plasticizer components in an amount effective for inhibiting the formation of optical artifacts primarily in polymer based optical elements in PBS assemblies. While polymer based PBS optical elements are discussed, it will be understood that the present invention is directed to the use of one or more plasticizer components in the adhesive that act as a crystallization inhibitor for inhibiting formation of relatively large domains and/or particles (e.g. 0.1-0.3 μM or 100-300 nanometers in size) in any polymer based optical element adhered to an adhesive. As such, optical artifacts created by crystallization/or particle formation due to exposures to specific radiation over certain periods of time are inhibited. For example, such specific radiation may include light having wavelengths in or above the blue range, (e.g., wavelengths longer than 420 nm.), with light intensity that is significantly higher than light intensity that the polarizing film would experience in a reference rear projection TV. As a result, the diminishment of artifacts prolongs the stability and/or useful life of the optical elements for their intended purposes.

The transparent adhesive composition resin composition may be acrylic, vinyl, ether, epoxy, or urethane based. In this embodiment, it may be a curable resin, such as a transparent or optical adhesive resin composition. The transparent or optical adhesive resin composition possesses high strength and low-viscosity and contains additives that allow it to be cured either by exposure to elevated temperatures, or upon exposure to UV and visible light in a relatively short period of time. Other suitable curatives are contemplated by this invention. The transparent adhesive composition may also be a pressure sensitive adhesive. The transparent adhesive resin composition may comprise one or more epoxy resins in an amount that can vary depending on the desired properties and uses of the resulting composition. In this regard, typical suitable epoxy transparent resins include, but are not limited to, epoxy resins from a group consisting of multifunctional or monofunctional, aromatic or aliphatic epoxy resins along with multifunctional or monofunctional aromatic or aliphatic alcohol or amine containing curatives.

The transparent adhesive resin composition used in such PBS systems also contains other additives besides the one or more plasticizer components and additives noted above. These other additives may include, for example, light stabilizers such as an excited state quencher, an antioxidant, a UV absorber, and a radical scavenger. The transparent adhesive resin composition may also comprise one or more curatives in a suitable amount. In this embodiment, the transparent adhesive resin composition is disposed on a surface as a thin layer. It can be applied in any suitable manner, such as bar coating or as metered drops that are allowed to spread. Typically, the thickness of the applied transparent adhesive resin composition may range from about 1 μM to about 200 μM. More typically, the thickness may range from about 10 μM to about 60 μM. Other thickness ranges of the transparent adhesive resin composition can be used depending on the desired properties and use of the composition as well as the ingredients of the composition. If the thickness is too thin then not enough of the plasticizer is able to migrate to the polarizing film so as to inhibit formation of the optical artifacts therein.

While the exemplary embodiments herein may be described in the context of an adhesive for delivering a plasticizer, the principles and scope of the present disclosure are not limited thereby. Rather, the present disclosure is more broadly directed to compositions that may be particularly adapted for use in allowing an effective amount of a plasticizer to migrate to delay formation of the haze by thwarting or inhibiting crystallization. Such a composition should also be transparent as that term is used in the present application. It will be also be appreciated that the plasticizer may be directly applied, such as by coating or other suitable approach.

Plasticizers

According to one aspect of the present description one or more plasticizer components may be included in the adhesive. It was deduced by the present investigators that the optical artifacts, such as haze, are induced in multilayer reflective polarizing film 12 when exposed to relatively high levels of incident radiant energy and heat. These relatively high levels are experienced in, for example, LCOS projection systems. It is believed that the noted shortcomings of the polymer based optical elements are due to light flux having caused multilayer reflective polarizing film 12 to undergo chain scission due to, for example, known Norrish cleavage and other reactions. As a result, it has been observed that this tends to lower the molecular weight (MW), thereby creating cleaved sections of the chain that are more mobile than the original polymer chain. It was deduced that these lower MW sections tend to concentrate or agglomerate over time in multilayer reflective polarizing film 12. Such concentration or agglomeration tends to create haze in multilayer reflective film 12 thereby diminishing the latter's stability and transmissivity.

Slight haze formation also enables light scatter, allowing the high intensity light to more effectively interact with the polymer, which effectively increases the damage. The increased mobility and growing concentrations of the lower MW species allows, for example, PET and/or PEN moieties, to even further concentrate to the point of crystallization or particle formation of such moieties. It was further deduced that heat enables increased movement of the lower MW species as well as the scission reactions, thereby increasing the rate of crystallization. The resulting particles eventually grow to sizes that create what is observed as a 'whitish' haze in multilayer reflective polarizing film 12.

This scenario is very different from typical degradation that is experienced in polymers of this type, such as by ultraviolet radiation. Typically, a yellowing is noticed as the first optical sign of light/heat induced degradation and there are specific strategies based on absorbing the offending light and minimizing the resulting yellow in the film. For example, UV inhibitors may inhibit photodegradation of optical polymer films. However, the present description addresses a different strategy, which is to thwart the non-typical haze (i.e., whitish haze) that is generated in the PBS assembly by crystallization or particle formation.

The crystallization inhibitors of the present invention are plasticizers, which tend to inhibit the growth of such crystals or particles in multilayer reflective polarizing film 12. According to the present invention, the plasticizers are chosen from a general group. Some examples of typical plasticizers consist of glycols, such as ethylene glycol, polypropylene glycol, di(ethylene glycol) ethyl ether and triethylene glycol, aromatic or aliphatic esters, such as di(2-ethylhexyl) adipate, di(ethylene glycol) benzoate, and water.

Such plasticizers tend to migrate between an adhesive layer and multilayer reflective polarizing film 12 adhered thereto, and thence into the film, whereby crystallization of, for example, PET and/or PEN moieties, are diminished significantly in the adjacent film layers. The amount of the plasticizer and migration ability are important parameters in delaying formation of the haze.

It will be appreciated that more than one plasticizer can be used according to the present description. In one embodiment, both ethylene glycol and water can be used. Water is thought to prevent the crystallization by physically inserting itself between two potentially crystallizable materials, getting in the way by association and steric hindrance. Other combinations of plasticizer components can be used. Examples of such combinations include but are not limited to: general glycols and water; glycols and esters; esters and water; and aromatic or aliphatic moieties that interact with the polymers making up the MOF.

In one illustrated embodiment, the transparent adhesive resin composition for use in this application comprises one or more epoxy resins in an amount of up to about 99.5 weight percent, based on the total weight of the composition. The epoxy composition of this description may comprise one or more epoxy resins in an amount of from about 75 weight percent to about 98 weight percent, based on the total weight of the composition. Further, the epoxy composition of this invention may comprise one or more epoxy resins in an amount of from about 94 weight percent to about 97 weight percent, based on the total weight of the composition.

The plasticizer can be present in the transparent adhesive resin composition in an amount that will obtain the desired degree of prevention of formation of the artifacts. The amount of one crystallization inhibiting plasticizer component employed in the adhesive material may vary widely but it usually forms between about 1 and 30 weight percent, or even between about 1 and about 5 weight percent.

The transparent adhesive resin composition of this invention may contain up to about 3.5 weight percent, or even up to about 6 percent, of various additives such as fillers, stabilizers, adhesion promoters (for example, silica, silanes, antioxidants, radical scavengers, excited state quenchers, and UV absorbers, and the like, so as to reduce the weight and/or cost of the epoxy composition, adjust viscosity, provide additional reinforcement, modify the transparency of the epoxy compositions and optical assemblies, and/or to stabilize the PBS assembly from degradation.

Figure 4:
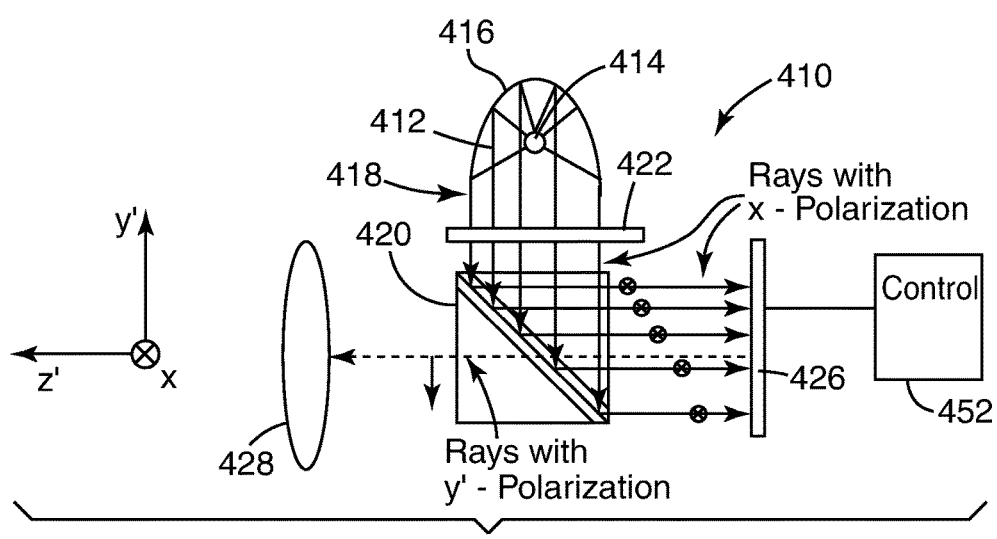
FIG. 4 schematically illustrates a projection system.

One embodiment of an optical imager system is illustrated in FIG. 4, where system 410 includes light source 412, for example arc lamp 414 with reflector 416 to direct light 418 in a forward direction. Light source 412 may also be a solid state light source, such as a light emitting diode or a laser light source. System 410 also includes PBS 420, e.g., the single or multi-film PBS described herein. Light with x-polarization, i.e., polarized in a direction parallel to the x-axis, is indicated by the circled x. Light with y-polarization, i.e., polarized in a direction parallel to the y-axis, is indicated by a solid arrow. Solid lines indicate incident light, while dashed lines indicate light that has been returned from reflective imager 426 with a changed polarization state. Light provided by light source 412 can be conditioned by conditioning optics 422 before illuminating PBS 420. Conditioning optics 422 change the characteristics of the light emitted by source 412 to characteristics that are desired by the projection system. For example, conditioning optics 422 may alter any one or more of the divergence of the light, the polarization state of the light, the spectrum of the light. Conditioning optics 422 may include, for example, one or more lenses, a polarization converter, a pre-polarizer, and/or a filter to remove unwanted ultraviolet or infrared light.

The x-polarized components of the light are reflected by PBS 420 to reflective imager 426. The liquid crystal mode of reflective imager 426 may be smectic, nematic, or some other suitable type of reflective imager. If reflective imager 426 is smectic, reflective imager 426 may be a ferroelectric liquid crystal display (FLCD). Reflective imager 426 reflects and modulates an image beam having y-polarization. The reflected y-polarized light is transmitted through PBS 420 and is projected by projection lens system 428, the design of which is typically optimized for each particular optical system, taking into account all the components between projection lens system 428 and the imager(s). Controller 452 is coupled to reflective imager 426 to control the operation of reflective imager 426. Typically, controller 452 activates the different pixels of reflective imager 426 to create an image in the reflected light.

Figure 5:
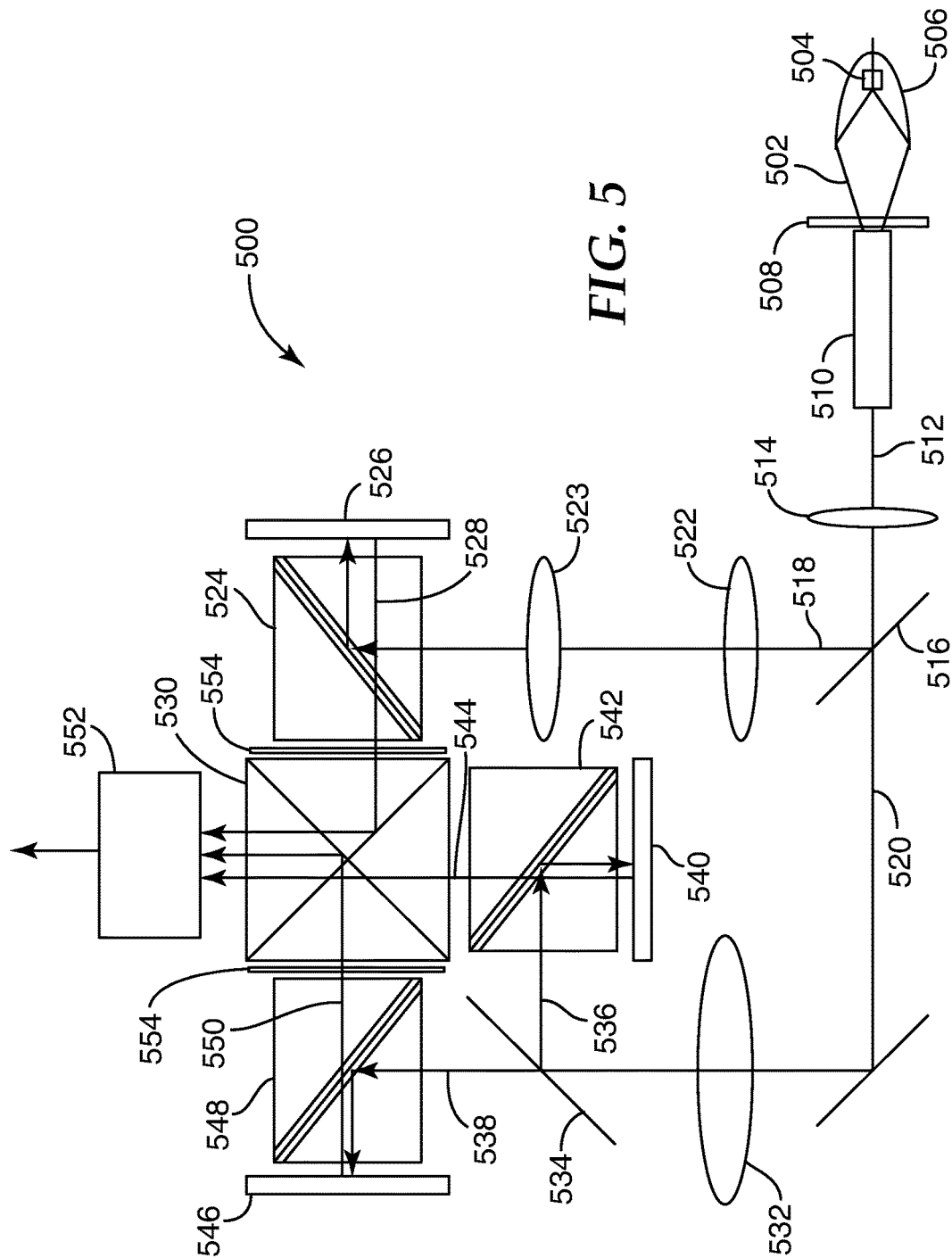
FIG. 5 schematically illustrates another projection system.

An embodiment of multi-imager projection system 500 is schematically illustrated in FIG. 5. Light 502 is emitted from source 504. Source 504 may be an arc or filament lamp, or any other suitable light source for generating light suitable for projecting images. Source 504 may be surrounded by reflector 506, such as an elliptic reflector (as shown), a parabolic reflector, or the like, to increase the amount of light directed towards the projection engine.

Light 502 is typically treated before being split into different color bands. For example, the light 502 may be passed through optional pre-polarizer 508, so that only light of a desired polarization is directed towards the projection engine. The pre-polarizer may be in the form of a reflective polarizer, so that reflected light, in the unwanted polarization state, is redirected to source 504 for re-cycling. Light 502 may also be homogenized so that the imagers in the projection engine are uniformly illuminated. One approach to homogenizing light 502 is to pass light 502 through reflecting tunnel 510, although it will be appreciated that other approaches to homogenizing the light may also be employed.

In the illustrated embodiment, homogenized light 512 passes through first lens 514 to reduce the divergence angle. Homogenized light 512 is then incident on first color separator 516, which may be, for example, a dielectric thin film filter. First color separator 516 separates light 518 in a first color band from remaining light 520.

Light 518 in the first color band may be passed through second lens 522, and optionally third lens 523, to control the beam size of light 518 in the first color band incident on first PBS 524. Light 518 passes from first PBS 524 to first imager 526. Imager 526 reflects image light 528 in a polarization state that is transmitted through PBS 524 to x-cube color combiner 530. Imager 526 may include one or more compensation elements, such as a retarder element, to provide additional polarization rotation and thus increase contrast in the image light.

Remaining light 520 may be passed through fourth lens 532. Remaining light 520 is then incident on second color separator 534, for example a thin film filter or the like, to produce light beam 536 in a second color band and light beam 538 in a third color band. Light beam 536 in the second color band is directed to second imager 540 via second PBS 542. Second imager 540 directs image light 544 in the second color band to x-cube color combiner 530.

Light beam 538 in the third color band is directed to third imager 546 via third PBS 548. Third imager 546 directs image light 550 in the third color band to x-cube color combiner 530.

Image light 528, 544 and 550 in the first, second and third color bands is combined in x-cube color combiner 530 and directed as a full color image beam to projection optics 552. Polarization rotating optics 554, for example half-wave retardation plates or the like, may be provided between PBS 524, 542 and 548 and x-cube color combiner 530 to control the polarization of the light combined in x-cube color combiner 530. In the illustrated embodiment, polarization rotating optics 554 are disposed between x-cube color combiner 530 and first PBS 524 and third PBS 548. Any one, two, or all three of PBS 524, 542, and 548 may include one or more multilayer reflective polarizing films as described herein.

It will be appreciated that variations of the illustrated embodiment may be used. For example, rather than reflect light to the imagers and then transmit the image light, the PBS may transmit light to the imagers and then reflect the image light. The above described projection systems are only examples; a variety of systems can be designed that utilize the multi-film PBS of the present invention.

EXAMPLES

The polyester multi-layer reflective polarizing films used were similar in construction. The adhesives were made in accordance with general methods of making adhesives. Of course, each of the adhesives represented a different example of at least one crystallization inhibiting plasticizer component according to the present invention.

Experimental Setup

General

PBS assemblies were tested with a light-irradiating device that focused substantial light onto the multilayer optical film (MOF) (inside the PBS). The PBSs' contained MOF film designed to reflect a certain polarization of "blue light." The incident light was filtered to deliver a band of light in the blue range, with about a 434 nm low wavelength cutoff and about a 514 nm long wavelength cutoff (50% transmission for the specified cuts). A descriptive quantification of the light intensity incident on the test samples was referred to as the intensity ratio. This ratio compared the highest watts/$mm^2$ experienced by the test PBS to the watts/$mm^2$ experienced by a PBS in a reference rear projection television. This watts/$mm^2$ "experience" was a combination of actual light intensity delivered to the PBS by the lamp/optics configuration, along with the amount of times that light traveled to and from the PBS. In our typical accelerated testing, the PBS test film experienced about 12 times the light intensity as a reference rear projection TV's PBS; this was called a "12×" test, with 12× referring to this intensity ratio between the tester and a reference TV. Further explanation of the intensity ratio calculation can be found in the published paper C. L. Bruzzone, J. J. Schneider, and S. K. Eckhardt, "6.1 Photostability of Polymeric Cartesian Polarizing Beam Splitters", SID 04 Digest, pp. 60-63 (2004).

For all samples, the outer temperature of the PBS cube assembly was artificially controlled to about 42° C. The PBS's were observed with the naked eye, and also monitored by transmissive UV/visible spectra of the PBS assembly taken at periodic times during the experiments. The spectra allowed for the calculation of b*, a typical quantification of yellowness. Failure was determined by an unacceptable change in color, reflected in a b* color value of 3.75.

The adhesive was mixed in a similar manner for each sample, excepting for exact formulation differences. Additives were first dissolved into the amine based curative and then that mixture was mixed with the epoxy resin. The adhesives were allowed to sit for 1 hour to remove bubbles and then used in the PBS construction. PBS assemblies were constructed in the same manner for all samples. The construction consists of applying metered drops of adhesive to the outlet prism, laying the film on the adhesive, applying drops of adhesive to the film, and covering with the inlet prism. The PBS was cleaned by lightly wiping the surfaces with acetone and then the assembly was cured in a 60° C. oven for 24 hrs.

Samples 1-15

Samples 1-15 were prepared under estimated humidity of 10-20% RH. The experimental samples tested the use of water and three other possible plasticizers. The plasticizers were mixed into an epoxy-based adhesive (containing light stabilizers). The plasticizer structures are shown below:

Plasticizers (other than water) used in experiments to extend accelerated lifetime

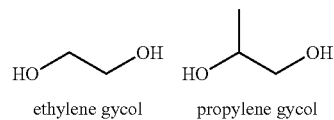

ethylene gycol    propylene gycol

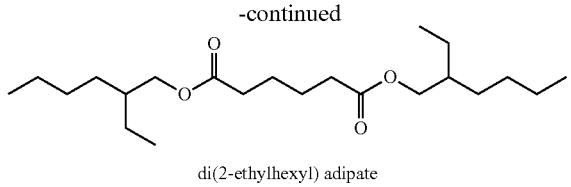

di(2-ethylhexyl) adipate

Results

The numerical data in the list below is separated into four columns. "Actual time (hours) to failure (AHTF)" was the elapsed time until the PBS assembly developed a b* color of 3.75. "Acceleration intensity ratio ("X")" was the average light intensity experienced by the test sample relative to that experienced by a PBS in a reference rear projection television. "(AHTF)*("X")" was the actual hours to failure multiplied by the intensity ratio. "Estimated increase in lifetime as ratio of control sample average." was the ratio of the sample (AHTF)*("X") to the control value average of 11461. It was a measure of how many times longer the sample lived vs. the controls. Control referred to film and adhesive that was standard, with no added plasticizers or treatments, see samples 1-5. Vacuum treated film, see samples 6 and 7, referred to film that was subjected to 0.1 Torr for 2 days, and then immediately used in the construction of a PBS. This vacuum treatment was meant to simulate a film that experiences very dry conditions before testing.

The data in Table 1 show that plasticizers extend the accelerated lifetime of the PBS assemblies. Plasticizer-containing samples afforded lifetimes that ranged from about 1.2 to 1.6 times the control lifetime. Adding water to the adhesive also afforded increased lifetimes. In actual use, a PBS will need to function for the life of the rear projection TV.

It is felt that plasticizers with lower volatility than water are important tools since water concentrations may change based on the climate over the actual usage timeframe. The vacuum treated film showed a lower lifetime than the control. This helps to show that lack of water (plasticizer) is detrimental to lifetime. Even though environmental humidity can equilibrate the water concentration in a film, the vacuum samples show that this equilibration is not so fast that the effects of initial extreme dryness can be completely overcome within the accelerated testing duration.

Figure 6:
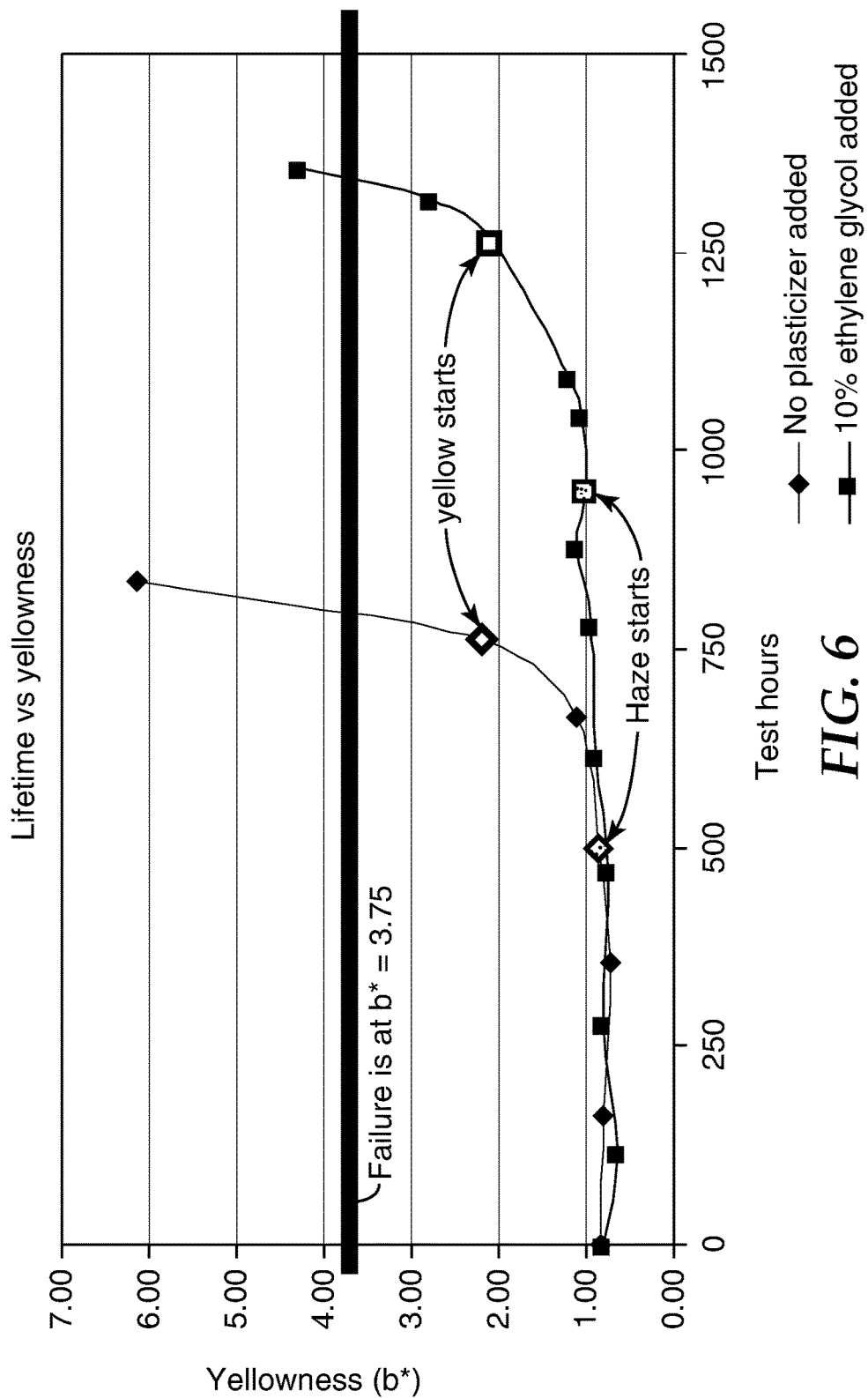
FIG. 6 illustrates a graph comparing a PBS having an adhesive(s) to a PBS that does not have such adhesive(s).

Reference is made to FIG. 6 in which is illustrated a graph of Lifetime v. Yellowness (comparing lifetime hours of PBS assemblies vs. b* values for yellowness) for illustrating an example of the dramatic increase in useful life afforded to PBS assemblies using a multi-layer film and an adhesive made according to the present invention. For a PBS assembly in which a multi-layer film and the adhesive of the present invention was not used, the commencement of the yellowing occurred at about 750 hours. This is in sharp contrast to the yellowing for a PBS assembly in which an adhesive that includes one of the crystallization inhibiting plasticizers of the present invention (i.e., 10% ethylene glycol) delayed commencement of yellowing to about 1300 hours.

This invention may take on various modifications and alterations without departing from its spirit and scope. Accordingly, this invention is not limited to the above-described aspects thereof, but is to be controlled as set forth in the following claims and any equivalents thereof.

What is claimed is:

1. A method of forming a polarizing beam splitter, the method comprising:
providing a first prism;
providing a second prism;
providing a multilayer reflective polarizing film;
attaching the multilayer reflective polarizing film to the first prism with a first adhesive, the first adhesive comprising at least 10 weight percent, and below 15 weight percent, of a crystallization inhibiting plasticizer component for inhibiting formation of (i) crystallized domains; (ii) particles; or (iii) a combination thereof;
attaching the multilayer reflective polarizing film to the second prism with a second adhesive to form an assembly; and
curing the assembly.

2. The method of claim 1, wherein the second adhesive comprises a crystallization inhibiting plasticizer component in an amount effective for inhibiting formation of (i) crystallized domains; (ii) particles; or (iii) a combination thereof.

3. The method of claim 1, wherein the second adhesive is the same as the first adhesive.

TABLE 1

Lifetimes afforded by various samples

| Sample | Sample Type | Actual Hours to Failure (AHTF) | Acceleration Intensity Ratio ("X") | (AHTF) * ("X") |
| --- | --- | --- | --- | --- |
| 1 | Control sample containing no Plasicizer | 1242 | 11.3 | 14035 |
| 2 | Control sample containing no Plasicizer | 862 | 11.9 | 10258 |
| 3 | Control sample containing no Plasicizer | 836 | 11.8 | 9865 |
| 4 | Control sample containing no Plasicizer | 1311 | 104 | 13634 |
| 5 | Control sample containing no Plasicizer | 928 | 123 | 11414 |
| 6 | Control sample containing no Plasicizer | 765 | 125 | 9663 |
| | Control sample average of samples 1-6 | 991 | 11.7 | 11461 |
| 7 | Sample containing no plasticizer, vacuum treated film | 745 | 121 | 9015 |
| 8 | Sample containing no plasticizer, vacuum treated film | 745 | 106 | 7897 |
| 9 | Sample containing 3% by wt water added to adhesive | 1407 | 12 | 16884 |
| 10 | Sample containing 3% by wt water added to adhesive | 1620 | 108 | 17496 |
| 11 | Sample containing 10% by wt ethyleneglycol added to adhesive | 1357 | 120 | 16284 |
| 12 | Sample containing 10% by wt ethyleneglycol added to adhesive | 1315 | 106 | 13939 |
| 13 | Sample containing 30% by wt di(2-ethylhexyl)adipate added to adhesive | 1315 | 121 | 15912 |
| 14 | Sample containing 20% propyleneglycol by wt added to adhesive | 1620 | 104 | 16848 |
| 15 | Sample containing 20% propyleneglycol by wt added to adhesive | 1811 | 10 | 18110 |

4. The method of claim 1, wherein the first adhesive and second adhesive each comprises at least 10 weight percent of crystallization inhibiting plasticizer.

5. The method of claim 1, wherein the crystallization inhibiting plasticizer component is from a group consisting of: glycols, such as ethylene glycol, polypropylene glycol, di(ethylene glycol) ethyl ether, and triethylene glycol; and aromatic or aliphatic esters, such as di(2-ethyhexyl) adipate and di(ethylene glycol) benzoate.

* * * * *

UNITED STATES PATENT AND TRADEMARK OFFICE
CERTIFICATE OF CORRECTION

PATENT NO. : 10,520,744 B2
APPLICATION NO. : 15/589657
DATED : December 31, 2019
INVENTOR(S) : James DiZio et al.

It is certified that error appears in the above-identified patent and that said Letters Patent is hereby corrected as shown below:

In the Specification

Column 3
Line 53, delete "Dureya," and insert -- Duryea, --, therefor.

Column 10
Line 60 (approx.), delete "lifetime" and insert -- lifetime. --, therefor.
Line 66 (approx.), delete "gycol" and insert -- glycol --, therefor.
Line 66 (approx.), delete "gycol" and insert -- glycol --, therefor.

Column 11
Line 34-43 (approx.), delete "It is felt that plasticizers with lower volatility than water are important tools since water concentrations may change based on the climate over the actual usage timeframe. The vacuum treated film showed a lower lifetime than the control. This helps to show that lack of water (plasticizer) is detrimental to lifetime. Even though environmental humidity can equilibrate the water concentration in a film, the vacuum samples show that this equilibration is not so fast that the effects of initial extreme dryness can be completely overcome within the accelerated testing duration." and insert the same on Column 11, Line 33 (approx.) as a continuation of the same paragraph.

Column 11-12
Line 50 (approx.), delete "Plasicizer" and insert -- Plasticizer --, therefor.
Line 51 (approx.), delete "Plasicizer" and insert -- Plasticizer --, therefor.
Line 52 (approx.), delete "Plasicizer" and insert -- Plasticizer --, therefor.
Line 53 (approx.), delete "Plasicizer" and insert -- Plasticizer --, therefor.
Line 54 (approx.), delete "Plasicizer" and insert -- Plasticizer --, therefor.
Line 55 (approx.), delete "Plasicizer" and insert -- Plasticizer --, therefor.

In the Claims

Signed and Sealed this
Twenty-sixth Day of April, 2022

Katherine Kelly Vidal
*Director of the United States Patent and Trademark Office*

Column 13
Line 8 (approx.), in Claim 5, delete "di(2-ethyhexyl)" and insert -- di(2-ethylhexyl) --, therefor.